Figure 1:
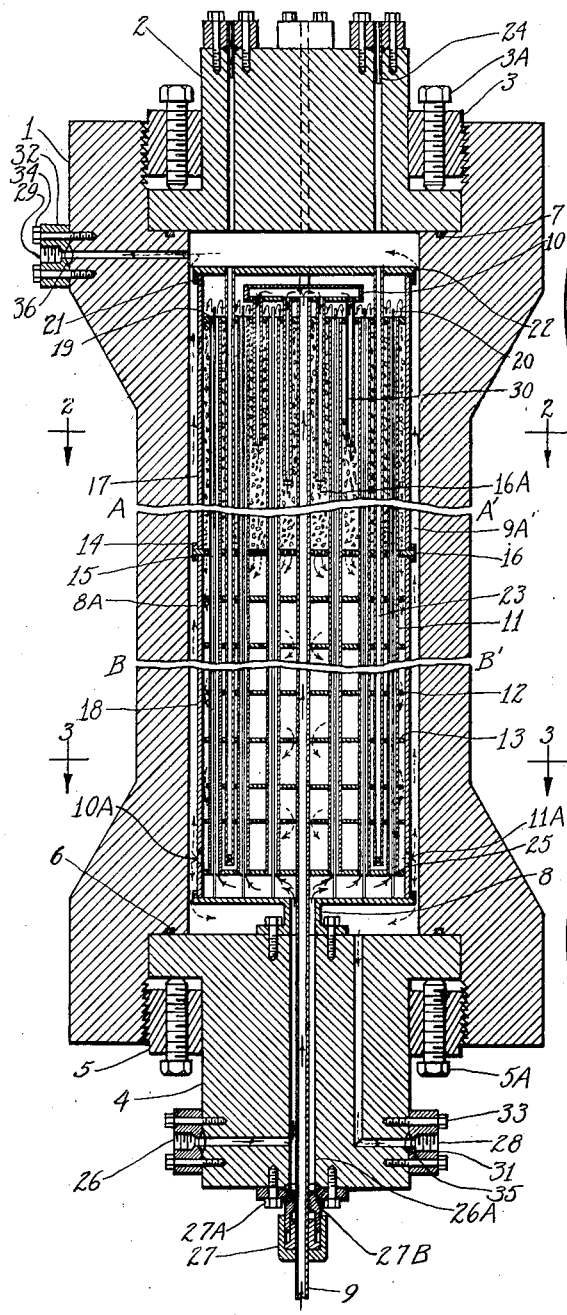

March 8, 1932.  W. J. EDMONDS  1,848,466
CATALYTIC APPARATUS
Filed Oct. 6, 1928

INVENTOR.
William J. Edmonds
BY
Francis M. Crawford ATTORNEYS.

Patented Mar. 8, 1932

1,848,466

UNITED STATES PATENT OFFICE

WILLIAM J. EDMONDS, OF TERRE HAUTE, INDIANA, ASSIGNOR TO COMMERCIAL SOLVENTS CORPORATION, OF TERRE HAUTE, INDIANA, A CORPORATION OF MARYLAND

CATALYTIC APPARATUS

Application filed October 6, 1928. Serial No. 310,844.

The present invention relates to the production of methanol by the high pressure catalytic reaction of hydrogen with carbon oxides. More particularly, the invention relates to a novel process and apparatus for these purposes which is characterized by an accurate temperature control and by autothermal operation.

The art of synthesizing methanol has now become well established in the literature. Among the United States patents on this subject that may be mentioned are Patents 1,558,559; 1,608,643; 1,609,593; and 1,624,924; 1,624,925; 1,624,926; 1,624,927; 1,624,928; 1,624,929.

When a mixture of hydrogen with carbon monoxide and carbon dioxide, or a mixture of the two oxides, is passed over a catalytic mass comprising a mixture of metals or of their oxides at a pressure in excess of 100 atmospheres and at a temperature of about 350–450° C. methanol is produced. In case pure carbon monoxide is employed, the product obtained will be practically pure methanol, but in the case of the dioxide, a molecule of water is produced for each molecule of methanol formed. In practice, all of the gaseous mixture does not react on the first contact; and the residual, unreacted gases are circulated again and again over the catalyst, the reaction product being cooled each time to separate out the methanol (or methanol and water) in liquid form.

Best results are obtained when the proportion of hydrogen present is in excess of the amount theoretically required to react with the carbon oxides present, but a strict proportioning of the ingredients present is not necessary to the success of the process. The amount of gases converted to methanol on each passage through the catalyst will depend upon the catalyst activity, the temperature of the reaction, the space velocity, and a number of minor factors.

The present invention relates to a methanol process and apparatus which is not limited to the use of any specific catalyst or gas proportion. It relates to a method and apparatus by which the methanol catalyst is kept at a uniform temperature, and by which the necessary heat is supplied by the exothermic reaction itself. The heat given off by the reaction is conserved within the reaction vessel where it is used to heat the incoming raw materials and also to maintain the catalyst temperature. This type of process is known as an "autothermal process".

Another advantage of the invention lies in the close control of the catalyst temperature which is made possible by the process and apparatus herein set forth. The optimum reaction temperature is in the neighborhood of 400° C. and when any part of the catalyst reaches a temperature much in excess of 400° C., the reaction taking place at that point no longer produces pure methanol, various undesirable by-products being obtained. In addition to this bad effect a worse one is likely to occur, namely, that a temperature much in excess of the optimum reaction temperature may also destroy the activity of the catalyst itself.

On the other hand, if the catalyst, or any part of it, is cooled from the optimum temperature, the methanol process will operate inefficiently, and the degree of conversion will be less than the maximum possible. For the reasons outlined, it is important that every portion of the catalyst be maintained at exactly the optimum reaction temperature. The invention provides a means and process for doing this.

As previously stated, the reaction of hydrogen with carbon oxides to produce methanol is an exothermic one. The reaction of pure carbon monoxide with hydrogen is more highly exothermic than the reaction of carbon dioxide with hydrogen. Various figures have been given in the literature which purport to give the heat generated by the two reactions:—

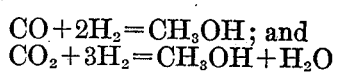

$CO + 2H_2 = CH_3OH$; and
$CO_2 + 3H_2 = CH_3OH + H_2O$ and while the specific figures given may be open to question, the basic fact that more heat is given off in the case of the reaction of carbon monoxide is not open to dispute.

Hence it might appear at first glance that autothermal operation could be much more easily achieved in the case of the first instance than in the second. However, the industrial operation of the methanol process is not based on the use of pure gases. No matter whether pure carbon monoxide or dioxide is introduced into the process, in the circulating system itself both gases will be present, owing to various side reactions. Further, the reacting gases are not introduced in precise molecular proportions, and consequently there is always some extra hydrogen present which absorbs heat from the catalyst on each passage through it and gives up that heat when the reaction product is cooled to condense out liquid methanol. For the reasons mentioned, the practical difficulties of achieving autothermal operation and close control of catalyst temperature are of the same order, no matter whether carbon monoxide or carbon dioxide is used as the principal carbon oxide entering the reaction, though autothermal operation is rendered easier in the case of carbon monoxide by the somewhat greater heat of reaction.

The nature of this present process and apparatus may best be understood in connection with the drawings forming a part of this specification. These drawings depict improved apparatus and show, also, the mode of operation.

Referring to the drawings, Fig. 1 represents a cross-sectional elevation of the converter taken through its center.

Figure 2:
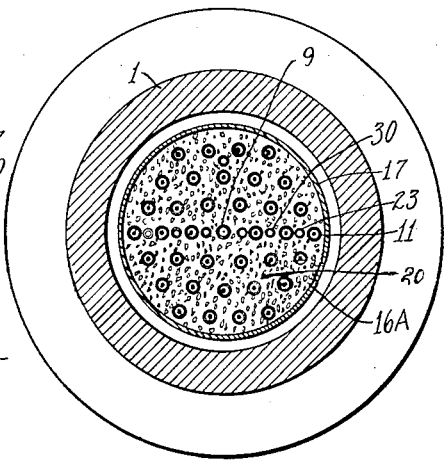
Figure 3:
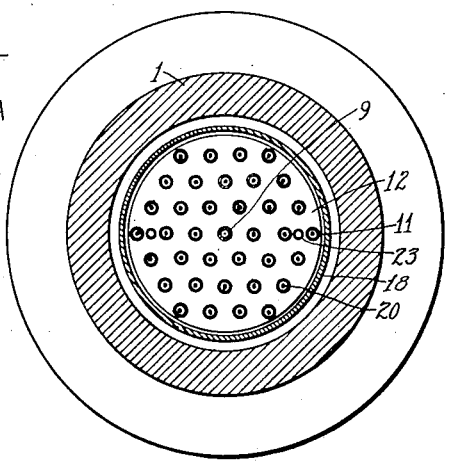

Fig. 2 is a sectional view of the converter taken along the line 2—2 of Fig. 1, and Fig. 3 is a sectional view of the converter taken along the line 3—3 of Fig. 1. Identical reference numerals are used throughout the several views.

In Fig. 1 the reference numeral 1 represents the pressure resistant and corrosion resistant wall of the converter. In practice, this may be composed of chrome-vanadium steel, or some similar alloy, and may be internally lined or plated with copper or chromium. The member 1 is actually an elongated tube, both ends of which are closed by similar structures. The top of the member 1 is closed by a plug 2, which rests on small shoulders on the internal wall of 1. A pressure tight joint is obtained by means of pressure exerted on the plug shoulders by means of a ring 3, which is thread connected to the tube 1. The ring 3 receives the pressure screws 3a, which bear against the shoulders on the plug 2.

The bottom of the tube 1 is similarly closed by the plug, or lower head 4, which also engages small shoulders on the internal wall of 1, similarly as described above; and again a pressure tight joint is obtained by means of pressure exerted upon the plug shoulders by means of the ring 5, which receives the pressure of the screws 5a, bearing against the shoulders on the plug 4. The ring 5 is thread connected to the tube 1; all similar to the construction already described. The lower and upper plugs, or heads, are thus held in engagement with the gaskets 6 and 7, respectively, as shown in Fig. 1, the action of these gaskets contributing to form pressure tight joints under the action of the pressure applied to the respective heads.

While the tube 1 is actually a long integral part, the drawings have been shortened as indicated at a—a′ and b—b′.

The plug 4 has secured to it the member 8, serving as a supporting flange for the structure to be hereinafter described, a by-passed gas inlet tube 9 passing through the plug 4 and supporting flange 8, and being annularly spaced within these members, provides a main gas inlet by way of the resulting annular space, as will be later set forth.

Inside the tube 1, and supported by the flange 8, there is positioned a structure in the form of another tube and indicated generally by 8a. This structure, hereinafter referred to as a "bomb", may consist of copper or of alloy steel plated with copper or chromium. Between the tube 1 and the bomb 8a, there is an annular space 9a through which gases may travel as will later be described. The bomb 8a is closed at both top and bottom, but is open to the annular passage 9a near the bottom by means of a series of small ports on its periphery. These are indicated at 10a and 11a on Fig. 1.

Within the bomb 8a there is positioned a catalyst basket, catalyst, and a heat exchanger. The component parts of these may be best understood in their relation to the chemical process which takes place within the converter. For this reason, in further describing the apparatus and process it will be assumed that the catalyst is at the optimum reaction temperature and that a mixture of hydrogen and carbon oxides is passing through this converter and contacting with the catalyst where a portion of the gas reacts to form methanol, and that the cooled residual hydrogen and carbon oxide mixture is being added to the raw gases passing into the bomb.

As will be seen from Fig. 1, the bomb 8a is conveniently formed of two sections, one of which contains the catalyst, and is therefore the reaction chamber, while the other serves as a preheater for the reactants. The bomb 8a has positioned within it a gas distributor 10 for distribution of cold inlet gas through the catalyst, and the tubes 11, serving as heat interchanger tubes by means of which the incoming reactant mixture may be preheated when the hot reaction products are passed in external contact with these tubes counter current to the incoming mixture. To assure maximum thermal contact between these tubes and the products of reaction, the preheating chamber is provided with a series of baffles 12 and 13 of alternating large and small diameter and so disposed as to assure maximum surface contact between the hot reaction products and the tubes 11.

It has been mentioned that the bomb 8a is formed of two sections, and it will be seen from Fig. 1 that when the apparatus is assembled there will be a connecting flange on each section adjacent each other. These flanges are indicated at 14 and 15 respectively, and in assembled relationship, a plate 16, serving as a catalyst supporting plate will be secured in position between the two flanges. The catalyst or reaction chamber is therefore located in the shell 17, the catalyst itself, indicated at 16a, being prevented from entering the preheating chamber, by the plate 16, which plate is, however, perforated to permit the passage of the reaction products from the reaction chamber.

As previously mentioned, the incoming reactant mixture is preheated by the hot reaction products. The preheating chamber is defined by the shell 18. The various tubes within the bomb are held in proper spaced relationship by the tube spacer header 19, while in the preheating chamber there is provided a plurality of core rods 20, of maximum diameter in order to give the maximum rate of heat transfer from the reaction products to the reactant mixture.

It will be seen that the shell 17 is provided with identical flanges at the opposite ends of the shell. One of these flanges, 14, has previously been described. The other flange 21 also serves as a connecting flange, it being the means of connecting the cover 22 with the shell 17. This cover 22 is apertured for the reception of the pyrometer tubes 23 and 24, the tubes 24 being dropped into tubes 23.

The elements of the entire assembly of tubes are held in properly spaced relation by the co-acting spacer headers 19 and 25, and while the header 19 is perforated for gas passage, the only openings in 25 are for the reception of the various tubes.

The gaseous reactant mixture is introduced into the bomb 8a through the gas inlet 26 by way of the annular passage 26a defined between the by-passed inlet tube 9 and the plug or head 4 and supporting flange 8. This space opens beneath the tube head 25, the gases entering the bomb being thus brought into communication with the open ends of the interchanger tubes 11, through which tubes these gases pass. The temperature within the bomb is indicated by pyrometers in the tubes 23 and 24, and it may be adjusted when necessary by by-passing cold gases through the inlet tube 9, which passes through a stuffing box 27 secured in pressure tight relationship with the plug or head 4 through the agencies of the pressure screws 27a and gasket 27b.

The gaseous reaction products find their way from the bomb 8a through ports 10a and 11a into the annular chamber 9a between the bomb 8a and tube 1, thus surrounding the bomb 8a with an atmosphere of gases before they issue from the gas outlets 28 and 29.

Any incoming gases by-passed into the inlet tube 9 pass through this tube into the distributor 10 and thence into the distributor tubes 30 whence they are passed into the catalyst.

The outlets 28 and 29 are provided, respectively with stuffing boxes 31 and 32, each maintained in gas tight relationship by the action of the pressure screws 33 and 34, and gaskets 35 and 36, respectively. Each of these members 31 and 32 is adapted, as by threading, for connection with lines leading the reaction products to whatever utilization thereof may be desired.

It will be seen, therefore, that the preheating and catalyst chambers are integral, the combined structures forming the "bomb" 8a. The whole is supported by the flange 8 and is free to move within the tube 1 because of the differential expansion between the shells 17 and 18 and the converter tube 1. Also, the tubes 11 are expanded into the tube head 25, but are not rigidly connected at any other point and are consequently free to move within the shells 17 and 18 on expansion. The catalyst supporting plate 16 is held rigidly in place by the connecting flanges 14 and 15. This catalyst plate is bored for each interchanger tube with plenty of allowance for movement of the tubes. Also, there are many small holes in the plate for the passage of the gases.

The major portion of the gas enters through the inlet 26, at the bottom of the bomb and passes up through the interchanger tubes, being warmed by thermal contact with the reacted gases passing on the outside of these tubes in contra-direction. The temperature of the warmed gas is measured by a thermocouple and the temperature regulated by by-passing cold gas in through the by-pass gas inlet 9 connected into a stuffing box 27. The tube 9 is welded into the tube head and extends through the head 4. It is free, however, to move in the stuffing box 27 and accordingly any differential expansion may be taken care of. This by-passed gas is distributed by means of the tubes 30 through the catalyst at a point several feet from the top. The object of this is to allow the catalyst to be heated to the reaction point by the entering gases and for the partially reacted gases to be cooled in order to level off the temperature gradient.

Entering gases are further heated during their passage through the upper part of the tubes by thermal contact with the catalyst itself. Passing the entering gases countercurrently to the flow through the catalyst will tend to cool the lower part of the catalyst and move the hot spot towards the top. The amount of heat in the upper half of the heat interchanger may be regulated by reducing the length and diameter of rods centered in the heat interchanger tubes and supported by lugs and projections from the upper ends of the tubes. Core rods 20 of maximum diameter are placed in the lower half of the heat interchanger in order to give the maximum rate of heat transfer. It is also to be noted in this connection that the baffle plates 12 and 13 are provided here for increasing the gas velocity on the outside of the tubes. Catalyst temperatures are noted by pyrometers inserted in wells or tubes 24 which are dropped into the outer pyrometer tubes 23. The reacted gases after they have passed through the heat interchanger will leave the apparatus at the lower head through the outlet 28. If the wall gets too hot, the reacted gases may be passed up along the wall and leave the converter at the outlet 29. Additional heat would also be removed from the catalyst by transfer through the wall 17 into these exit gases.

Catalyst may be charged and discharged from the converter by setting the whole converter in position up side down. The parts are now referred to as if this were the case. The inner parts would then be suspended from the flange 8, and the catalyst supporting plate 16 would be eliminated. Instead, a catalyst plate would be provided at the very bottom of the catalyst taking the place of the part specified therewith as 19. With flange 21 resting on the lower head, and the upper heads 4 and 8 removed, the catalyst is charged in until it has filled the bomb to the required point. The entire catalyst basket is then pulled up so that the head 8 can be attached to 18 and 4. The catalyst is removed simply by dropping it out with the heads 2 and 22 removed.

Although the converter herein set forth is illustrated and described as being installed on a vertical position it will be understood that the angle and plane of installation is not material to the invention, and it will also be apparent that many details of the construction may be modified without departing from the inventive concept and although the apparatus has been specifically described in connection with the manufacture of methanol, it is also adapted to the manufacture of other products, as for example higher alcohols, ammonia, etc. In fact any gas reaction of an exothermic character may be carried out by this type of converter through the operation of the process herein described.

The direction of the flow of the gases through the converter is indicated by the arrows on the drawings. The course of the reaction which permits autothermal operation and accurate control of the catalyst temperature consists in heating the cool incoming gases by thermal contact with the hot gaseous reaction products. This heating increases the temperature of the incoming gases very substantially but does not heat them quite to the optimum reaction temperature. The heated gases are then passed in thermal contact with the catalyst itself (where the exothermic methanol reaction is taking place) and this thermal contact not only raises the temperature of the incoming gases substantially to the optimum reaction temperature, but also serves to control the temperature of the catalyst itself in two ways:

1. To abstract heat from the catalyst so that its temperature will not rise above the desired reaction optimum;
2. To heat up any portions of the catalyst which may tend to be decreased in temperature, much below the reaction optimum.

In practice, sufficient heat is generated by the exothermic reaction taking place within the catalyst to provide more than enough heat to warm the incoming gases and to maintain the catalyst temperature when the process and apparatus is operated at practical space velocities, i. e., about 10,000. In fact, an excess of heat is usually generated. To control the temperature of the catalyst it is frequently necessary to dilute the hot gases from the heat interchanger with some cold gases, so that the mean temperature within the converter will not rise to too high a point. This temperature control is provided by means of the cold gas pipe 9, as previously explained, which rises through the center of the heat interchanger and delivers its cold gas under the distributor 10 at the top of the catalyst basket. By the adjustment of the stream of cold gas flowing from the end of this pipe, the desired temperature control may be easily obtained. To accurately observe the temperature within the converter, pyrometers may be located at convenient points, and the supply of cold gas may be regulated either manually or by suitable electrical connection to the indicating pyrometers.

In the foregoing description of the invention, it has been assumed that the process and apparatus was in operation and that the catalyst was at proper reaction temperature. Actually, in starting up the process and apparatus it is of course necessary to provide some outside source of heat. The process and apparatus may be put into operation by supplying previously heated gases to inlets 9 and 26. The simplest procedure is merely to pass the mixture of hydrogen and carbon oxides through some suitable gas heater and to convey them hot into the converter. On account of the massiveness of the apparatus, the heated gases must be passed into the converter for a considerable period before it is raised to reaction temperature, and as soon as the catalyst has been raised in temperature to a point where the methanol reaction starts, the heat of the reaction also assists in raising the converter temperature, provided that no cold gas is passed into the converter.

In place of supplying hot gases to the converter, it is of course possible to heat the catalyst sufficiently to start the methanol reaction by means of an electric heating element which may be positioned within the converter and in contact with the catalyst.

The improved process and apparatus, as above described, may be employed for the production of synthetic methanol with the various catalysts and gas mixtures already known in the art. For example, when a gas mixture comprising 10% carbon dioxide and 90% hydrogen is passed through the apparatus at a space velocity of 12,000 and at a reaction temperature of 400° C. in contact with a catalyst of the type described in Woodruff and Bloomfield's U. S. Patent 1,625,929— i. e., a mixture of zinc oxide chromium oxide, iron oxide, and zinc chloride—there is produced an hourly yield of methanol amounting to about 6.5 gallons per cubic foot of catalyst, together with an equivalent amount of water. If the gas mixture supplied to the process and apparatus consists of 10% carbon monoxide and 90% hydrogen, the other conditions remaining the same, the hourly yield of methanol is about 10 gallons per cubic foot of catalyst.

In the place of the catalyst mentioned, other catalysts, such as those described in U. S. Patents 1,625,924; 1,625,925; 1,625,926; 1,625,927; 1,625,928; 1,625,929 may be employed.

It will be apparent that many modifications of the details of the construction of the converter herein illustrated may be made without substantially affecting the essentials of the construction thereof, and it will be understood that it is desired to comprehend within the scope of this invention such modifications as may be necessary to adapt it to varying conditions and uses.

What is claimed is:

1. In a catalytic apparatus, a pressure-sustaining vessel, a reaction assembly comprising separable preheating and reacting chambers positioned to allow relative motion upon differential expansion of said chambers, and means loosely positioned within said chambers for introducing reactant gases therein, the said means comprising a tube adapted to introduce cold reactant gases into the reaction chamber, a distributor for the said gas, and tubes communicating with the distributor and adapted to contact the cold gases with the catalyst.

2. In a catalytic apparatus, a pressure-sustaining vessel, a reaction assembly within said vessel comprising separable cylindrical shells forming communicating preheating and reaction chambers, and a separable catalyst supporting plate removably secured between said shells to divide said chambers.

3. In a catalytic apparatus, a pressure-sustaining vessel, a reaction assembly within said vessel comprising separable cylindrical shells forming communicating preheating and reaction chambers, a separable catalyst supporting plate removably secured between said shells, and means loosely positioned in said plate for introducing reactant gases to said chambers to divide said chambers.

4. In a catalytic apparatus, a pressure-sustaining vessel, a reaction assembly within said vessel comprising separable cylindrical shells forming communicating preheating and reaction chambers, a separable catalyst supporting plate removably secured between said shells and preheating tubes for the passage of reactant gases thru the preheating chamber and opening into the reaction chamber loosely positioned in said plate to divide said chambers.

5. In a catalytic apparatus, a pressure-sustaining vessel, a reaction assembly within said vessel comprising separable cylindrical shells held in superposed position to form communicating preheating and reaction chambers, a separable catalyst supporting plate removably secured between said shells, and means for supporting said assembly from the bottom of said vessel to allow motion of said assembly relative to said pressure-sustaining vessel upon differential expansion of said assembly and vessel.

6. In a catalytic apparatus, a pressure-sustaining vessel, a reaction assembly within said vessel comprising separable cylindrical shells held in superposed position to form communicating preheating and reaction chambers, a separable catalyst supporting plate removably secured between said shells, means for supporting said assembly from the bottom of said vessel to allow motion of said assembly relative to said pressure-sustaining vessel upon differential expansion of said assembly and said vessel, and means loosely positioned within said chambers for introducing reactant gases therein, the said means comprising a tube adapted to introduce cold reactant gases into the reaction chamber, a distributor for the said gas, and tubes communicating with the distributor and adapted to contact the cold gases with the catalyst.

7. In a catalytic apparatus, a pressure-sustaining vessel, a reaction assembly removably supported within said vessel, the said assembly comprising separable cylindrical shells forming communicating preheating and reaction chambers and a separable catalyst supporting plate removably secured between said shells, and said assembly being positioned to allow motion relative to said pressure-sustaining vessel upon differential expansion of said assembly and said vessel.

8. In a catalytic apparatus, a pressure-sustaining vessel, a reaction assembly removably supported within said vessel, said assembly comprising separable cylindrical shells forming communicating preheating and reaction chambers, a separable catalyst supporting plate removably secured between said shells, and preheating tubes loosely positioned in said catalyst supporting plate to allow motion of said tubes relative to said cylindrical shells on differential expansion of said tubes and shells, said reaction assembly being positioned to allow motion relative to the pressure-sustaining vessel upon differential expansion of said assembly and said vessel.

9. In a catalytic apparatus, a pressure-sustaining vessel, a reaction assembly removably supported within said vessel, said assembly comprising separable cylindrical shells forming communicating preheating and reaction chambers, a separable catalyst supporting plate removably secured between said shells, means loosely positioned within said chambers for introducing reactant gases therein, and preheating tubes loosely positioned in said catalyst supporting plate to allow motion of said tubes relative to said cylindrical shells on differential expansion of said tubes and shells, said reaction assembly being positioned to allow motion relative to the pressure-sustaining vessel upon differential expansion of said assembly and said vessel.

In testimony whereof I affix my signature.

WILLIAM J. EDMONDS.